United States Patent [19]

Ciccone et al.

[11] Patent Number: 5,776,517
[45] Date of Patent: Jul. 7, 1998

[54] ADJUSTABLE MOLD CLAMPING WEDGES

[75] Inventors: Vince Ciccone; Frank Intihar, both of Ontario, Canada

[73] Assignee: Top Grade Machining Ltd., Mississauga, Canada

[21] Appl. No.: 745,727

[22] Filed: Nov. 12, 1996

[51] Int. Cl.[6] .................................................. B29C 33/20
[52] U.S. Cl. ...................... 425/168; 425/589; 425/450.1; 425/DIG. 129
[58] Field of Search ................................. 425/168, 589, 425/595, 450.1, 451.9, DIG. 129

[56] References Cited

U.S. PATENT DOCUMENTS

| | | | |
|---|---|---|---|
| 3,942,755 | 3/1976 | Robinson | 425/589 |
| 4,125,246 | 11/1978 | von Holdt | 425/589 |
| 4,986,944 | 1/1991 | Bertschi | 425/589 |

*Primary Examiner*—James P. Mackey
*Attorney, Agent, or Firm*—Barrigar & Moss

[57] ABSTRACT

An adjustable clamping or locking wedge is disclosed for use in an injection mold press. The clamping wedge has a main body portion with a main oblique wedging surface adapted to be engaged by a moving portion of a closing mold. The main body portion has a second oblique wedging surface located transversely of the main oblique wedging surface. A wedge is located for sliding engagement against the second wedging surface and supports the main body portion, and a threaded fastener is mounted between the main body portion and the wedge for moving the wedge and adjusting the position of the main oblique wedging surface in the mold press.

17 Claims, 3 Drawing Sheets

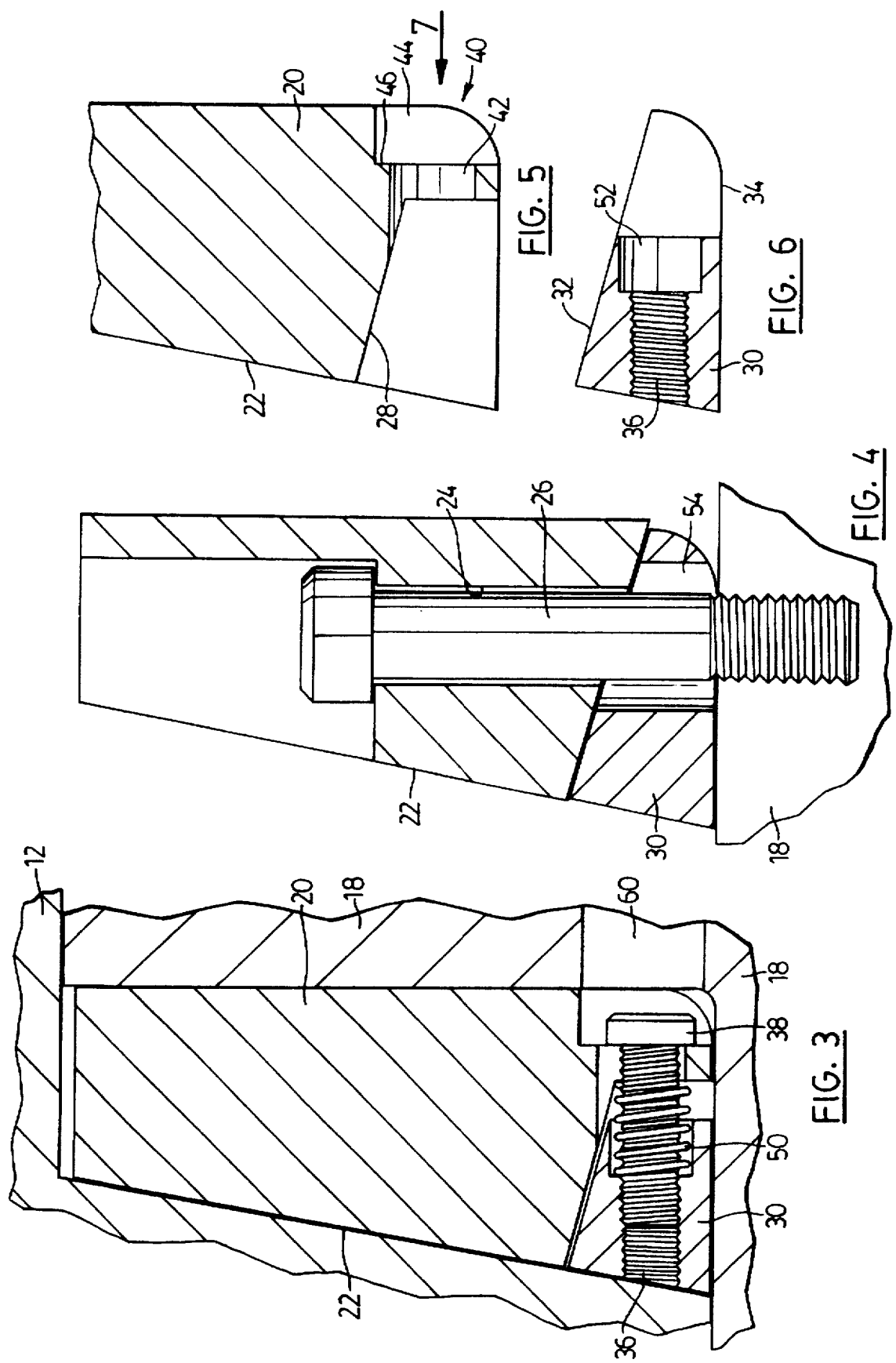

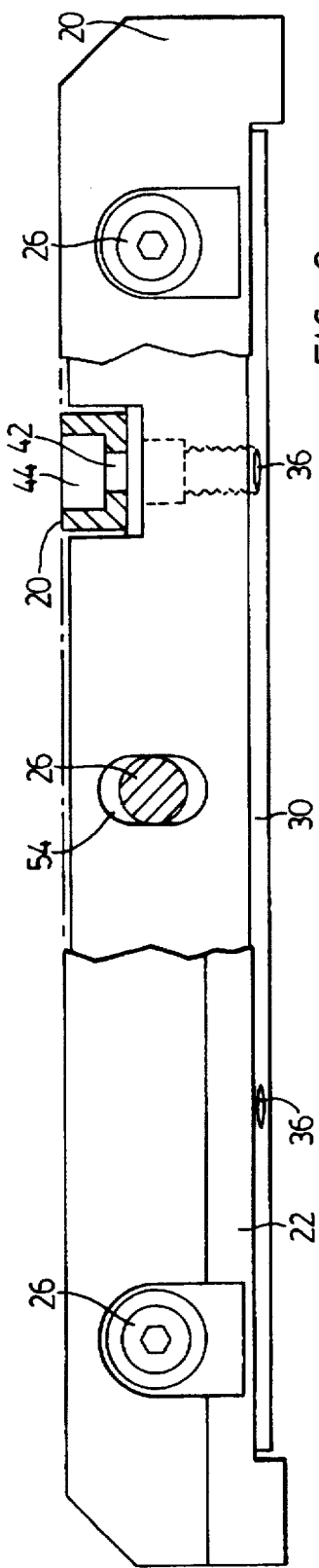
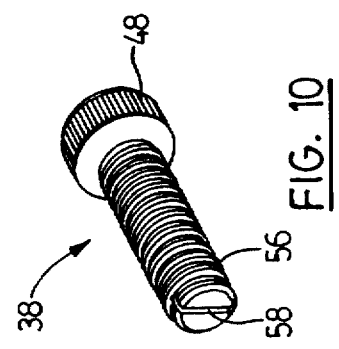
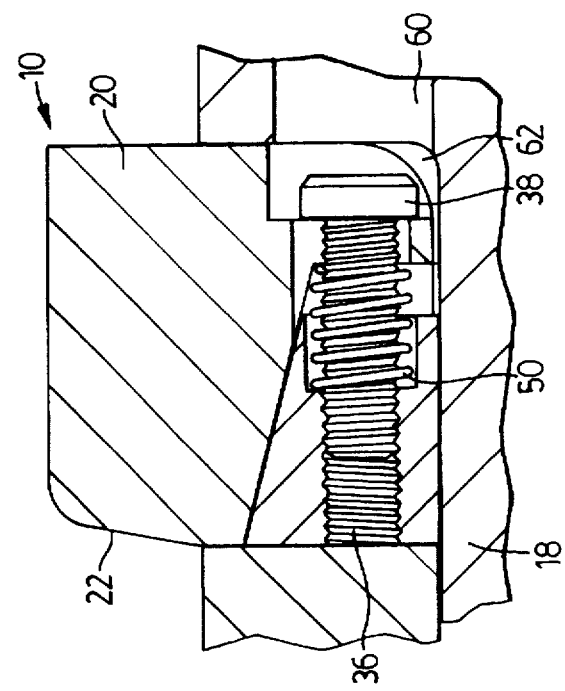
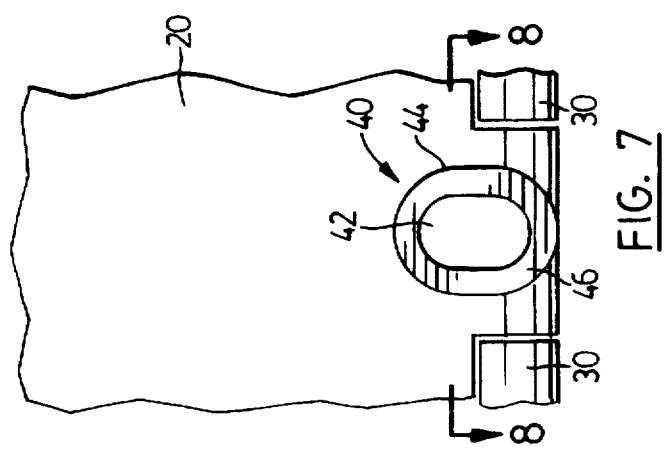

ADJUSTABLE MOLD CLAMPING WEDGES

FIELD OF THE INVENTION

This invention relates to injection molding presses, and in particular, clamping or locking wedges that are used to locate or centre molds or dies in the mold press.

BACKGROUND OF THE INVENTION

In injection molding, mold presses are used to clamp various die components together prior and during the molding process. It is necessary that these die components be aligned accurately for the molded components to be produced with the correct wall thicknesses, etc. As the mold press closes and the various die components are brought together, it is usual for the dies to engage clamping or locking wedges, or what are sometimes referred to as die locks or die wedges, to align or center the dies properly. These clamping wedges are usually just blocks of tool steel with oblique wedging surfaces which are engaged by the die components. The clamping wedges are removable from the mold press and are usually replaced relatively frequently because they are subject to considerable wear in view of the mass and forces of the components engaging and the clamping pressures used in injection mold presses.

In an attempt to reduce the frequency of replacement of these clamping wedges, shims are often used to relocate the oblique wedging surfaces of the clamping wedges and make up for wear. However, a difficulty with the use of shims is that it is very time consuming to make the necessary adjustments, and accuracy is also a problem.

It is an object of the present invention to provide a means for a quick and accurate adjustment of the mold clamping wedges, and this is accomplished by providing the clamping wedges with their own positioning wedges movable by threaded adjusters to adjust the position of the clamping oblique wedging surfaces.

SUMMARY OF THE INVENTION

According to the invention, there is provided an adjustable mold clamping wedge comprising a main body portion having an oblique wedging surface adapted to be engaged by a moving portion of a closing mold. The main body portion includes at least one slotted mounting hole for mounting the main body portion in a mold for position adjustment of the oblique wedging surface. The main body portion includes a second wedging surface located transversely of the oblique wedging surface. A positioning wedge is located for sliding engagement against the second wedging surface and has a bearing surface adapted to engage the mold and support the clamping wedge therein. Also, threaded adjustment means is mounted between the main body portion and the wedge for moving the wedge relative thereto, thereby adjusting the position of the oblique wedging surface.

BRIEF DESCRIPTION OF THE DRAWINGS

Preferred embodiments of the invention will now be described, by way of example, with reference to the accompanying drawings, in which:

FIG. 3 is an enlarged cross-sectional view of the area indicated by chain dotted circle 3 in FIG. 2;

FIG. 4 is an enlarged cross-sectional view taken along lines 4—4 of FIG. 1;

FIG. 5 is an enlarged cross-sectional view taken along lines 5—5 of FIG. 1 with the lower wedge components removed for clarity;

FIG. 6 is an enlarged cross-sectional view taken along lines 5—5 of FIG. 1, but showing only the lower adjusting wedge;

FIG. 7 is a partial elevational view taken in the direction of arrow 7 of FIG. 5;

FIG. 8 is a top plan view, partly broken away, of the clamping wedge shown in FIG. 1;

FIG. 9 is an enlarged cross-sectional view similar to FIG. 3 but showing another embodiment of a clamping wedge according to the present invention; and FIG. 10 is a perspective view of the threaded adjusters or bolts used in the embodiment of FIG. 1.

DETAILED DESCRIPTION OF THE PREFERRED EMBODIMENT

Figure 1:
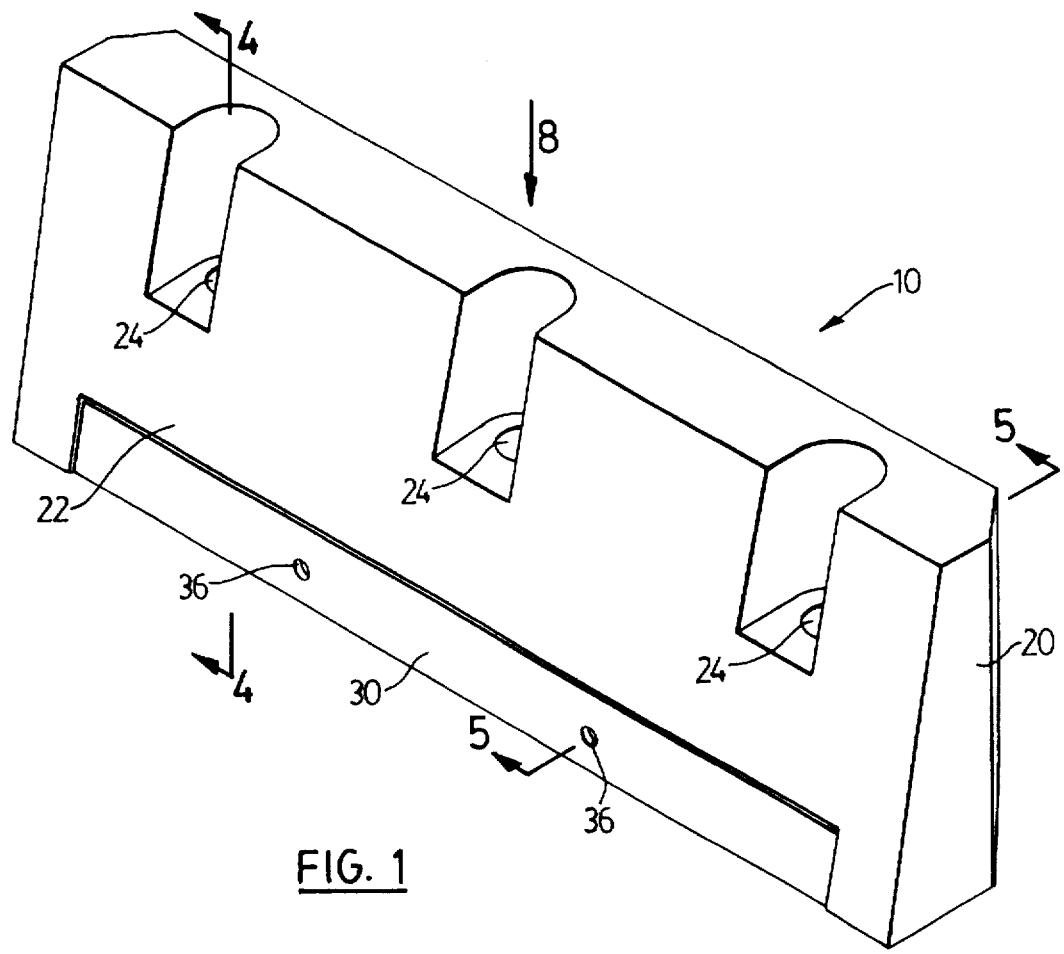
FIG. 1 is a perspective view of a preferred embodiment of a mold clamping wedge according to the present invention.

Referring to the drawings, a preferred embodiment of an adjustable mold clamping wedge is generally indicated in FIG. 1 by reference numeral 10. The use of clamping wedge 10 is indicated diagrammatically in FIG. 2, where clamping wedges 10 are used to position die components in an injection mold press for producing an article like a cup or bucket. A female upper mold half 12 has a cavity 14 which is filled by a plug 16 being part of a lower mold half 18. Upper and lower mold halves 12, 18 could be the actual mold press, or they could be the actual dies that are mounted in a mold press (not shown). For the purposes of this disclosure, upper and lower mold halves 12, 18 could be either dies or parts of the mold press. In either case, it is necessary to align the upper and lower mold halves 12, 18, so that the wall thicknesses of the article being molded are produced accurately. Clamping wedges 10 provide the necessary centering or alignment of the mold halves as they come together prior to the injection or die casting process.

Clamping wedge 10 includes a main body portion 20 having an oblique wedging surface 22 which is adapted to be engaged by the upper mold portion or half as it moves downwardly to close the mold. Main body portion 20 has slotted mounting holes 24, and bolts 26 pass therethrough to mount clamping wedges 10 onto lower mold half 18. As seen best in FIG. 5, main body portion 20 has a second wedging surface 28 located transversely of the oblique wedging surface 22. A positioning wedge 30 (see FIG. 6) has an upper sliding surface 32 for sliding engagement against second wedging surface 28. Positioning wedge 30 also has a lower bearing surface 34 which engages the lower mold half 18 and supports clamping wedge 10 therein.

Positioning wedge 30 also includes transverse threaded holes 36, and bolts or cap screws 38 (see FIG. 10) are threaded into threaded holes 36 (see FIGS. 3 and 9).

As seen best in FIGS. 5 and 7, main body portion 20 has slotted shoulder openings 40 for accommodating bolts 38. Shoulder openings 40 include slotted holes 42 and recesses 44 that define shoulders 46. Bolts 38 have heads 48 which bear against shoulders 46, so that as bolts 48 are turned to be threaded into threaded holes 36, positioning wedge 30 is pulled inwardly to raise the main or upper body portion 20 of mounting wedge 10. It will be appreciated that as bolt 38 is screwed into positioning wedge 30 and the wedge is moved inwardly, bolt 38 moves downwardly in slotted hole 42, because main body portion 20 is being lifted up, and vice versa when bolt 38 is unscrewed from wedge 30. Coil springs 50 are located in recesses 52 and urge or bias wedges 30 outwardly tending to allow main body portion 20 to be lowered when bolt 38 is unscrewed from wedge 30. In this way, when bolts 38 are backed off or unscrewed, springs 50 cause the wedges 30 to move outwardly and main body portion 20 to be lowered.

As seen best in FIGS. 4 and 8, wedges 30 include slotted holes or openings 54 in registration with slotted holes 24 to accommodate mounting bolts 26 and allow wedges to slide in and out or reciprocate under main body portion 20.

As seen best in FIG. 10, bolts or cap screws 38 have a distal end 56 formed with a drive slot 58. Drive slots 58 are provided so that bolts 38 can be turned from the front through holes 36 which then become access openings. Alternatively, bolts 38 can be turned by engaging the bolt heads 48 from behind in the usual manner. For this purpose, access openings 60 (see FIGS. 3 and 9) can be provided in lower mold half 18 for gaining access to bolts 38.

Figure 2:
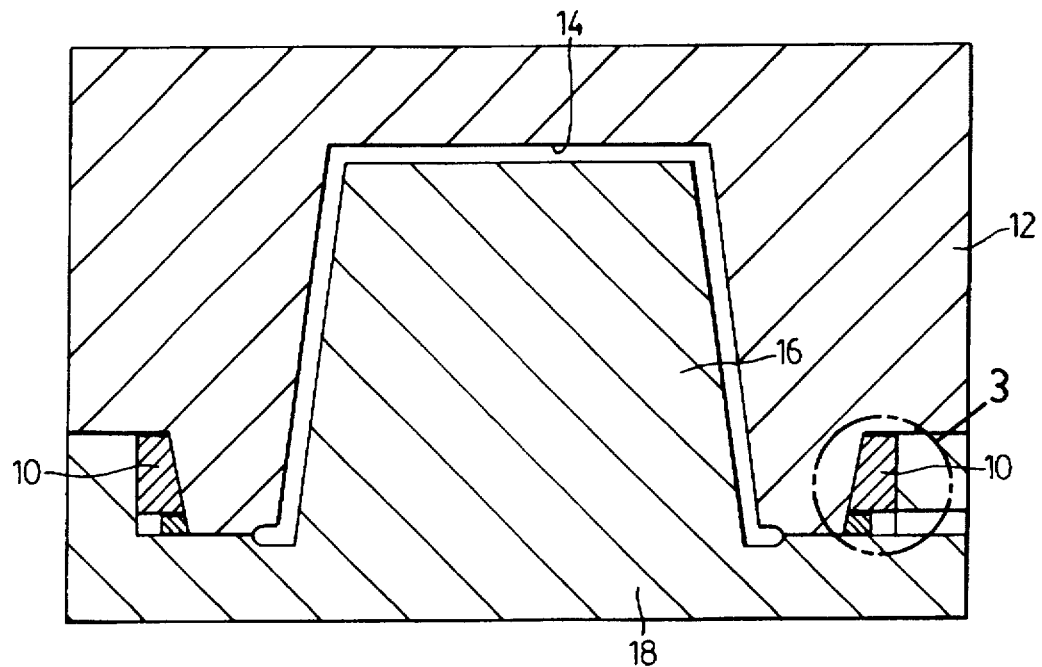
FIG. 2 is a diagrammatic cross sectional view showing the clamping wedge in use in a mold press.

It will also be noted that in the embodiment shown in FIG. 9, clamping wedge 10 is located in a slot 62 in lower mold half 18 rather than being located in a corner as in FIGS. 2 and 3. Of course, it will be appreciated that clamping wedges 10 can be located in any position, horizontal or vertical, as the situation requires.

In operation, one or more clamping wedges 10 are mounted in a mold press in the position shown, for example, in FIG. 2. As oblique wedging surface 22 wears, so that upper mold half 12 is not being positioned accurately enough, bolts 38 are simply adjusted moving wedge 30 to move the wedge main body portions 20 up or down, causing oblique wedging surfaces 22 to be located again in the desired position. Since bolts 38 can be accessed easily either through holes 36 or access openings 60, very little machine down time is required to adjust clamping wedges 10. All that is required is that mounting bolts 26 be loosened while the adjustment is being made, and then retightened.

It will be appreciated that the angle of second wedging surface 28 and sliding surface 32 can be varied to give any desired range of adjustment for clamping wedges 10. Also, the thread pitch of bolts 38 can be chosen to obtain fine or course adjustment for any given amount of rotation of bolts 38, as will be appreciated by those skilled in the art.

Having described preferred embodiments, it will be appreciated that various modifications can be made to the structures described above. For example, in reference to FIGS. 3 and 9, threaded adjusters or bolts 38 have been shown to be positioned parallel to the wedge bottom or bearing surface 34. This requires the use of slotted shoulder openings 40, because the upper or main body portion of clamping wedge 10 moves up and down as wedge 30 moves in and out. However, if the threaded adjusters 38 are located parallel to second wedging surface 28 and sliding surface 32, then there is no relative vertical movement between holes 38 and upper or main body portion 20. In this case, regular circular holes could be used in place of slotted holes 42. Also, as another embodiment when bolts 38 are located parallel to wedging surface 28, threaded holes 42 could be used in place of slotted holes 42, and bolts 38 could be replaced by threaded rods having a left hand thread on one end and a right hand thread on the other, and with these opposite threads, rotation of the threaded adjuster 38 would cause the wedge to move in opposite directions depending on the direction in which adjusters 38 are rotated.

It will also be appreciated that the slotted shoulder openings 40 could be formed in wedges 30 and the bolts or threaded rods threaded into the main body portion 20 of clamping wedge 10. It will also be appreciated that slotted shoulder openings 40 could be formed in both the upper or main body portion 20 and on the opposite side in wedges 30, and separate threaded adjusters could be used from both sides to cause wedge 30 to move in and out. In this case, springs 50 could be eliminated. It will also be appreciated that the wedges 30 could be turned around, so that they are on the inside as viewed in FIG. 3. Finally, it will be appreciated that the clamping wedges 10 can be made any size desired, with the wedges 30 being sized accordingly, as well as the number of mounting holes 24 and threaded adjusters 30.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An adjustable mold clamping wedge comprising:
a main body portion having an oblique wedging surface adapted to be engaged by a moving portion of a closing mold; said main body portion including at least one slotted mounting hole for mounting the main body portion in a mold for position adjustment of said oblique wedging surface; the main body portion including a second wedging surface located transversely of the oblique wedging surface; a positioning wedge located for sliding engagement against said second wedging surface and having a bearing surface adapted to engage the mold and support the clamping wedge therein; and threaded adjustment means mounted between the main body portion and the positioning wedge for moving the positioning wedge relative to the main body portion, thereby adjusting the position of the oblique wedging surface.

2. An adjustable mold clamping wedge as claimed in claim 1 wherein the threaded adjustment means includes a bolt having a head, the bolt being threadably mounted in one of the main body portion and the positioning wedge, and wherein the other of the main body portion and the positioning wedge includes a slotted shoulder opening adapted to accommodate the bolt and allow the bolt to move transversely therein upon rotation of the bolt moving the positioning wedge.

3. An adjustable mold clamping wedge as claimed in claim 2 wherein the bolt is threadably mounted in the positioning wedge and said slotted shoulder opening is formed in the main body portion.

4. An adjustable mold clamping wedge as claimed in claim 1 wherein the threaded adjustment means is a threaded rod threaded into one of the main body portion and the positioning wedge and adapted to engage the other of the main body portion and the positioning wedge, such that rotation of said rod causes relative movement between the main body portion and the positioning wedge.

5. An adjustable mold clamping wedge as claimed in claim 4 wherein the threaded rod is located parallel to the second wedging surface.

6. An adjustable mold clamping wedge as claimed in claim 5 wherein the threaded rod is threaded into both the main body portion and the positioning wedge, but with respective opposite threads, so that rotation of the rod causes the positioning wedge to move in opposite directions relative to the main body portion.

7. An adjustable mold clamping wedge as claimed in claim 4 wherein the rod is located so that it is not parallel to the second wedging surface; and further comprising means for permitting the rod to move transversely relative to said other of the main body portion and the positioning wedge which it engages.

8. An adjustable mold clamping wedge as claimed in claim 7 wherein said means for permitting the rod to move transversely is means defining a slotted opening through which the rod passes.

9. An adjustable mold clamping wedge as claimed in claim 2 wherein the bolt causes relative movement between the main body portion and the positioning wedge in one direction; and further comprising bias means for urging said main body portion and the positioning wedge to move in the opposite direction.

10. An adjustable mold clamping wedge as claimed in claim 4 wherein the threaded rod causes relative movement between the main body portion and the positioning wedge in one direction; and further comprising bias means for urging the main body portion and the positioning wedge to move in the opposite direction.

11. An adjustable mold clamping wedge as claimed in claim 7 wherein the threaded rod causes relative movement between the main body portion and the positioning wedge in one direction; and further comprising bias means for urging the main body portion and the positioning wedge to move in the opposite direction.

12. An adjustable mold clamping wedge as claimed in claim 1 wherein the positioning wedge includes at least one slotted opening in registration with the main body portion mounting hole to accommodate a clamping wedge mounting fastener passing therethrough.

13. An adjustable mold clamping wedge as claimed in claim 2 wherein one of the main body portion and the positioning wedge includes an access opening for accessing the bolt, and wherein the bolt has an end including a drive slot accessible from the access opening.

14. An adjustable mold clamping wedge as claimed in claim 4 wherein one of the main body portion and the positioning wedge includes an access opening for accessing the threaded rod, and wherein the threaded rod has an end including a drive slot accessible from the access opening.

15. An adjustable mold clamping wedge as claimed in claim 11 wherein one of the main body portion and the positioning wedge includes an access opening for accessing the threaded rod, and wherein the threaded rod has an end including a drive slot accessible from the access opening.

16. An adjustable mold clamping wedge as claimed in claim 1 wherein said threaded adjusting means includes a plurality of spaced-apart, threaded members mounted in one of the main body portion and the positioning wedge and engaging the other of the main body portion and the positioning wedge to cause relative movement therebetween upon rotation of the threaded members.

17. An adjustable mold clamping wedge as claimed in claim 16 wherein the threaded members cause relative movement between the main body portion and the positioning wedge in one direction; and further comprising bias means for urging said main body portion and the positioning wedge to move in the opposite direction.

* * * * *